(12) United States Patent
Hottelet et al.

(10) Patent No.: US 7,275,164 B2
(45) Date of Patent: Sep. 25, 2007

(54) SYSTEM AND METHOD FOR FENCING ANY ONE OF THE PLURALITY OF VOLTAGE ISLANDS USING A LOOKUP TABLE INCLUDING AC AND DC COMPONENTS FOR EACH FUNCTIONAL BLOCK OF THE VOLTAGE ISLANDS

(75) Inventors: Henry R. Hottelet, Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 10/906,017

(22) Filed: Jan. 31, 2005

(65) Prior Publication Data

US 2006/0174149 A1    Aug. 3, 2006

(51) Int. Cl.
  *G06F 1/00* (2006.01)
(52) U.S. Cl. ............... 713/300; 713/320; 713/340
(58) Field of Classification Search ............ 713/300, 713/320, 324, 330, 340
See application file for complete search history.

(56) References Cited

U.S. PATENT DOCUMENTS

| | | | |
|---|---|---|---|
| 5,483,656 A * | 1/1996 | Oprescu et al. ............ 713/320 |
| 6,167,524 A * | 12/2000 | Goodnow et al. .......... 713/300 |
| 6,348,744 B1 | 2/2002 | Levesque .................... 307/86 |
| 6,493,859 B1 * | 12/2002 | Gould et al. ................ 716/12 |
| 6,548,991 B1 | 4/2003 | Maksimovic et al. ...... 323/224 |
| 6,667,648 B2 * | 12/2003 | Stout et al. ................. 327/333 |
| 6,681,354 B2 * | 1/2004 | Gupta ......................... 714/725 |
| 6,720,673 B2 | 4/2004 | Blanco et al. .............. 307/64 |
| 7,085,945 B2 * | 8/2006 | Silvester ..................... 713/320 |
| 2002/0109413 A1 | 8/2002 | Malinovitch |
| 2003/0135830 A1 * | 7/2003 | Buffet et al. ................ 716/4 |
| 2003/0163743 A1 | 8/2003 | Endo |
| 2003/0168915 A1 | 9/2003 | Zhang et al. |

OTHER PUBLICATIONS

*Intelligent Energy Management/sup TM/ for Portable Embedded Systems*, Flautner, K. and Patel, D.I., SOC Conference, 2003. Proceedings. IEEE International (Systems-on-Chip), Sep. 2003, p. 415.
*A survey of techniques for energy efficient on-chip communication*, Raqhunathan, V., Srivastava, M.B., and Gupta, R.K., Design Automation Conference, 2003, Proceedings, pp. 900-905.
*Low Power System on Chip Implementation Scheme of Digital Filtering Cores*, Zwyssig, E.P., Erdogan, A.T., and Arselan, T., Lower Power IC Design Seminar, Jan. 19, 2001, London, UK, pp. 1-8.
*Powering Next-Generation Mobile Devices*, flyer from ARM, 4 pages.

* cited by examiner

*Primary Examiner*—Chun Cao
*Assistant Examiner*—Mark Connolly
(74) *Attorney, Agent, or Firm*—Downs Rachlin Martin PLLC

(57) ABSTRACT

An integrated circuit (IC) chip (100) containing a plurality of voltage islands (124I-M) containing corresponding functional blocks (104I-M) that can be selectively fenced, i.e., powered down, while saving the states of the corresponding inputs, and unfenced in order to manage power consumption of the chip. Each fencable functional block includes a power switch (140I-M) and state-saving circuitry (148I-M) for saving the state of the inputs to that functional block. A power modulation unit (PMU) (132) generates fencing signals (144I-M) that control the power switches and state-saving circuitries so as to selectively fence the corresponding functional blocks. The PMU generates the fencing signals as a function of one or more operating arguments.

13 Claims, 3 Drawing Sheets

SYSTEM AND METHOD FOR FENCING ANY ONE OF THE PLURALITY OF VOLTAGE ISLANDS USING A LOOKUP TABLE INCLUDING AC AND DC COMPONENTS FOR EACH FUNCTIONAL BLOCK OF THE VOLTAGE ISLANDS

FIELD OF THE INVENTION

The present invention generally relates to the field of integrated circuits. In particular, the present invention is directed to a system and method for dynamically managing power consumption of integrated circuitry.

BACKGROUND OF THE INVENTION

Power consumption of electronic devices that include integrated circuitry is increasingly becoming an important issue for any one or more of a number of reasons. For example, as the operating speeds of integrated circuits (ICs) continually increase, in general so, too, do the power requirements for these circuits, since power consumption varies in direct relation to the operating speed. In addition, as each new generation of technology brings a decrease in feature size and an increase in integration scale, power consumption of ICs generally increases due to the sheer presence of many more circuit elements, e.g., transistors and the like. Furthermore, with the increasing integration scale, electronic devices are capable of supporting more and more features. Power consumption typically increases with greater numbers of features, particularly when a feature requires circuitry that would not be needed in the absence of that feature.

While power consumption of ICs is becoming increasingly important regardless of whether the power source for an IC is portable, such as a battery or fuel cell, or non-portable, such as a power utility distribution network, power consumption is presently more critical in the context of portable power sources, which generally lag ICs in term of performance. For example, state-of-the-art lithium-ion and nickel-cadmium batteries can store only enough energy to power portable, or mobile, electronic devices, e.g., current-generation laptop computers and cell phones, typically for about two to five hours at full power before the batteries need to be recharged. While such operating times represent an improvement over previous-generation batteries, they are much shorter than most consumers would like.

There are a number of conventional methods for reducing power consumption of ICs. One method is to simply reduce the systemic operating voltage of the IC. While this method has the ability to significantly reduce the power consumption of ICs (e.g., reducing the operating voltage from 5V to 3.3V results in a gross power reduction of about 56%), there are practical limits to this method. Another method of reducing power consumption of ICs is to reduce the amount of logic circuitry. There are clearly practical limits to this method as well. Consequently, one, the other or both of these methods are typically used in connection with one or more power management methods that seek to reduce the power provided to portions, or "functional blocks," of ICs during periods when these blocks are not needed.

Generally, conventional power management methods involve dynamic scaling of voltage, frequency or both. In the context of integrated systems, such as a Systems On Chips (SOCs), that utilize standardized bus architectures and standardized functional blocks, e.g., standardized macros and peripherals, frequency scaling is particularly problematic. This is so because if the operating frequency is slowed to a point below the natural sampling rate of the transceivers, system data is lost. A solution to this data loss would be to redesign the transceivers to provide asynchronous message passing and allow the transceivers to be asynchronous to the bus architecture. Drawbacks of this solution are that it would be relatively costly and inherently risky in terms of system lockup potential when implemented with standardized bus interfaces that are designed to be synchronous to a system master.

SUMMARY OF THE INVENTION

In one aspect, the present invention is directed to an integrated circuit comprising a plurality of voltage islands each including a functional block having an operating argument. A power modulation unit is in electrical communication with each of the plurality of voltage islands and is operatively configured to fence any one of the plurality of voltage islands as a function of the operating argument of the functional block in the one voltage islands being fenced.

In another aspect, the present invention is directed to a method of managing power usage of an integrated circuit. The method comprises the step of providing an integrated circuit having a power budget and comprising a plurality of functional blocks each having an operating argument. At least any one of the plurality of functional blocks is selectively fenced as a function of a corresponding one of the operating arguments.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

Figure 1:
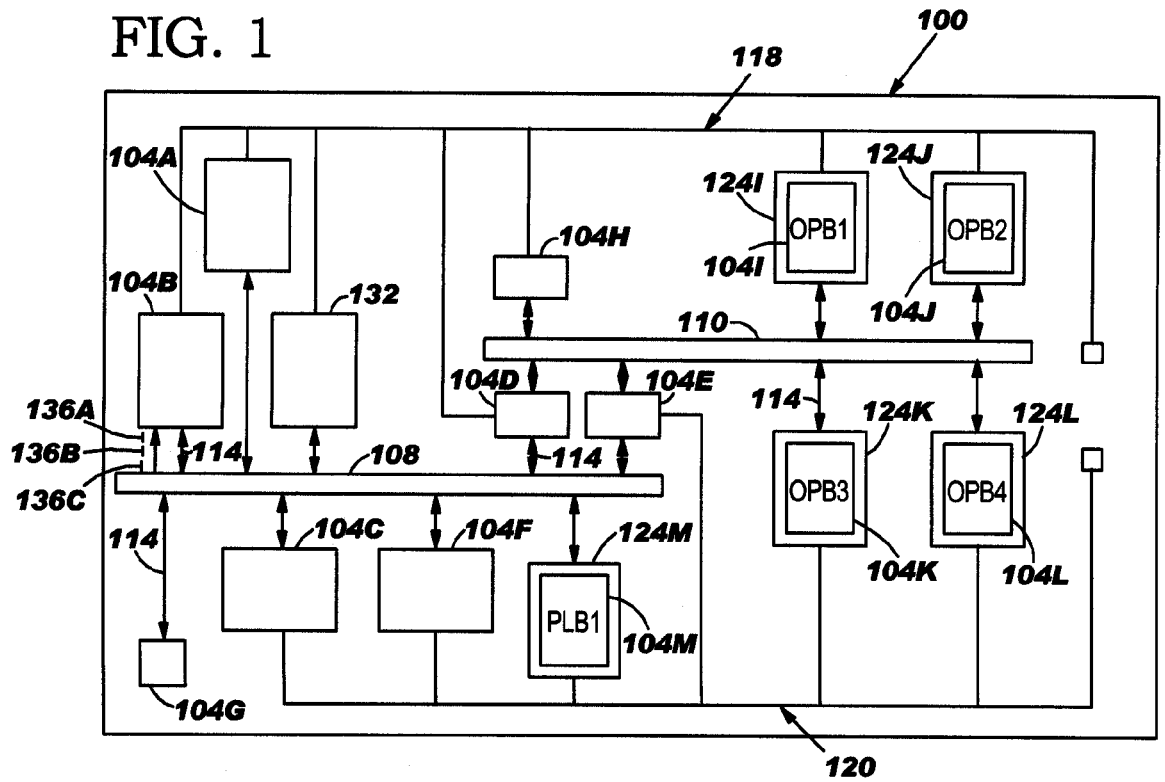
FIG. 1 is a high-level schematic diagram of an IC chip of the present invention.

Referring now to the drawings, FIG. 1 shows in accordance with the present invention an integrated circuit (IC) chip, which is denoted generally by the numeral 100. While IC chip 100 may be virtually any type of chip containing logic circuitry, the chip shown is a system-on-chip (SOC) type integrated system chip containing a variety of functional blocks 104A-M that communicate with one another via system buses 108, 110. System buses 108, 110 may be based on any suitable architecture, such as the CoreConnect™ bus architecture developed by International Business Machines, Inc., Armonk, N.Y., or the AMBA (Advanced Microprocessor Bus Architecture) bus architecture developed by ARM, Inc., Austin, Tex., among others. Using terminology from the CoreConnect™ architecture for convenience, bus 108 may be, e.g., a 128-bit processor local bus (PLB) and bus 110 may be, e.g., a 32-bit on-chip peripheral bus (OPB). Of course, in SOC-type chips having other bus architectures, more or fewer buses than buses 108, 110 of different designs may be provided.

In the present SOC-based example, functional blocks 104A-M may include macros, e.g., a microprocessor (104A), a dispatcher (104B), a SRAM controller (104C), an OPB bridge (104D), a DMA controller (104E), a PCI-X bridge (104F), customer interface (104G) and an OPB arbiter (104H), among others. Functional blocks 104A-M may also include peripherals, such as serial ports (104I), interrupt controllers (104J), parallel data ports (104K) and timers (104L), among others. Functional blocks 104A-M may also include one or more custom logic blocks, such as custom logic block 104M. Depending upon its type, each functional block 104A-M will typically be in communication with one, the other, or both of PLB and OPB buses 108, 110 and/or one or more other functional blocks via a corresponding number of communications links 114. Those skilled in the art will readily appreciate the variety of functional blocks, such as functional blocks 104A-M, that may be used aboard IC chip 100 and how these blocks may be placed in communication with one another, such that further examples and explanation is not necessary for them to appreciate the broad scope of the present invention.

IC chip 100 may also include one or more power networks, such as networks 118, 120, that provide an operating voltage to functional blocks 104A-M. Each power network 118, 120 may be any conventional power network, such as a standardized power grid that is often used in SOC type chips. One or more of functional blocks 104A-M may be connected to a corresponding power network 118, 120 in a manner that it can be isolated, i.e., disconnected, from the power network. In the present example, functional blocks 104I-M are of such type. The ability to isolate functional blocks 104I-M in this manner is sometimes described as placing the blocks into separate "voltage domains" or onto separate "voltage islands." For the convenience of correspondence to a patent incorporated herein by reference below, a functional block that is capable of being selectively disconnected from its power network is referred to herein as being on a "voltage island." In the present example, five functional blocks 104I-M are located on corresponding respective voltage islands 124I-M.

In this connection, it is noted that more or fewer of functional blocks 104A-M may be placed on corresponding voltage islands, depending upon a particular design. For example, in a particular design, it may be desirable to place all peripherals (blocks 104I-L in the present example) on corresponding voltage islands. In another design, it may be desirable to place some of the macros (blocks 104A-H in this example) and only some of the peripherals (again, block 104I-L) on voltage islands. Generally, the number of functional blocks placed on voltage islands will be determined on a case-by-case basis. In the present example, each of functional blocks 104I-M is located on its own voltage island 124I-M. However, in other embodiments, two or more functional block may be placed on a common voltage island. Further, it is noted that while the present example is based on an SOC architecture in which functional blocks 104A-M are generally either standard or custom macros or peripherals, in other applications the functional blocks may more generally be any portions of integrated circuitry that each include electrical elements that function as a group and that can be selectively powered up and down without negatively impacting the functioning of the powered up portions of the circuitry.

Figure 2:
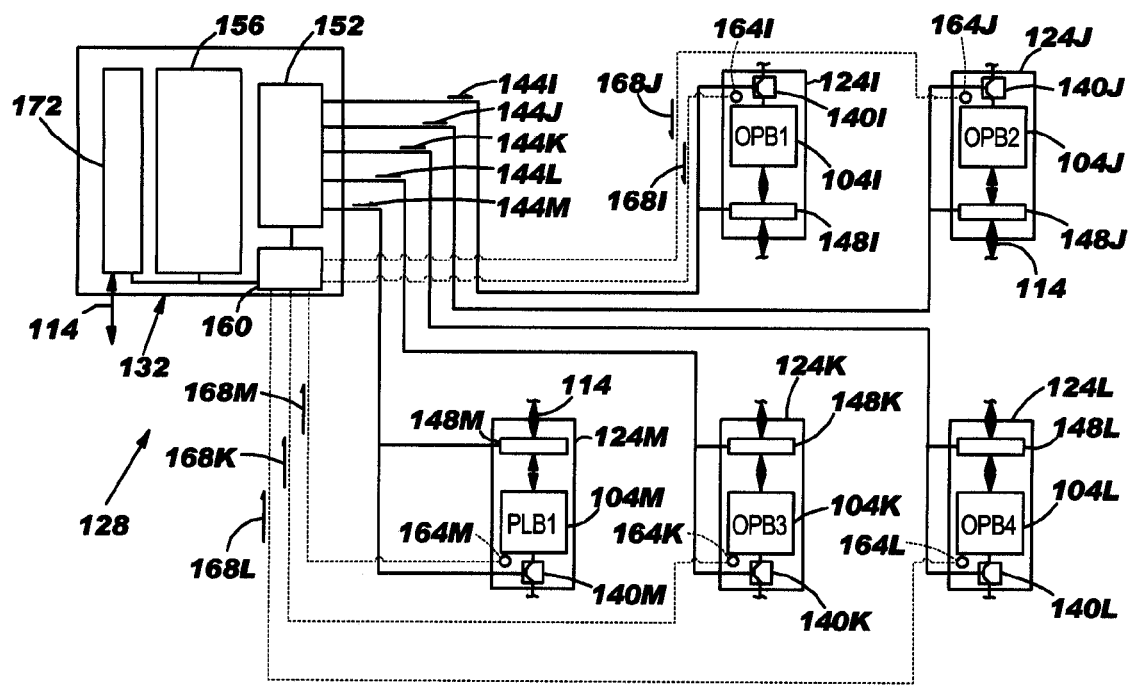
FIG. 2 is an enlarged schematic diagram of a portion the IC chip of FIG. 1 illustrating a power management system of the present invention.

Referring to FIGS. 1 and 2, FIG. 2 illustrates a power management system 128 of the present invention that includes a power modulation unit (PMU) 132 that can reduce the power consumption of IC chip 100 by selectively powering up and powering down functional blocks 104I-M based on the need to use these blocks and whether or not they are able to be used at a particular point in time. In general, the need to use a particular one of functional blocks 104I-M is determined by the ability of that block to properly process data of a particular thread 136A-C. The ability of each functional block 104I-M to be used at a particular time may be driven by the value at that time of any one or more arguments relating to that block. Examples of such arguments include the operational state of the functional block 104I-M at issue (e.g., powered up or powered down), the power requirement $P_{req}$ of that block in relation to an overall power budget $P_{budget}$ of IC chip 100 and temperature of the block, among others. Deciding whether or not a particular functional block 104I-M may be used at a particular time based on one or more arguments may be referred to as "intelligent" power management. The power management aspect of the present invention is evident because, when any of functional blocks 104I-M are not needed, their corresponding voltage islands 124I-M can be powered down, thereby conserving power or avoiding exceeding the power budget $P_{budget}$ of IC chip 100.

In order to disconnect each functional block 104I-M from the corresponding power network 118, 120, each voltage island 124I-M may be provided with a power switch 140I-M located between that functional block and the power network. Each power switch 140I-M may be controlled by PMU 132 via a corresponding "fencing" signal 144I-M and may comprise a transistor, as shown. Those skilled in the art will appreciate that in a practical power management system, such as power management system 128, it is generally not satisfactory to merely switch voltage islands 124I-M on and off without considering the effect powering down has on latches (not shown) within the corresponding functional blocks 104I-M. Without controlling the states of the input latches of functional blocks 104I-M, upon powering down a functional block the state of these latches may change, such that when the block is powered back up, it is not ready to process a thread, e.g., one of threads 136A-C. To circumvent the loss of the input state of each functional block 104I-M when powered down, each voltage island 124I-M may be provided with state-saving circuitry 148I-M for saving the input state of the corresponding block. This concept of powering down a voltage island, e.g., any of voltage islands 124I-M, while saving the input state of the corresponding functional block, e.g., functional blocks 104I-M, is generally known as "fencing." Fencing and an overview circuitry suitable for fencing in the context of the present invention is described in detail in U.S. Pat. No. 6,720,673 to Blanco et al., which is incorporated herein by reference in its entirety. As those skilled in the art will understand, state-saving circuitry 148I-M may include state-saving latches (not shown) and a MUX (not shown) that may be triggered by the corresponding fencing signal 144I-M. PMU 132 may comprise a signal unit 152 for providing fencing signals 144I-M to voltage islands 124I-M at the appropriate times. As those skilled in the art will appreciate, signal unit 152 may comprise one or more conventional registers (not shown), depending upon the number of voltage islands that are controlled.

As mentioned above, one level of intelligence that PMU 132 may have is the ability to determine whether or not a particular one of functional blocks 104I-M that needs to be used, i.e., the "destination" block, is already powered up. If the destination functional block 104I-M is already powered up, generally the only step to be taken is to send the thread (136A-C) under consideration to the corresponding block.

On the other hand, if the destination functional block 104I-M is not powered up, PMU 132 must send an appropriate fencing signal 144I-M to the corresponding voltage island 124I-M to close the corresponding switch 140I-M. Determining whether or not a functional block 104I-M is already powered up may be implemented in any of a number of ways, including providing PMU 132 with a lookup table 156 (see the Table below for an example) that includes a list of functional block identifiers (I) and their corresponding states (S), i.e., powered up (S=1) or powered down (S=0). In this case, the argument to be evaluated is the state of the destination functional block 104I-M and the function may be a truth statement as to whether or not S=1. PMU 132 may be provided with control logic 160 that performs the step of evaluating the function and generating an appropriate fencing signal 144I-M based on the results of this evaluation. As those skilled in the art will readily appreciate, control logic 160 may be implemented in software, hardware or a combination of software and hardware.

Another level of intelligence that PMU 132 may be provided with is the determination of whether or not the powering up of a particular functional block 104I-M will cause the overall power budget $P_{budget}$ of IC chip 100 to be exceeded. Generally, IC chip 100 can be said to have an overall power budget $P_{budget}$, i.e., a maximum power draw, above which continued operation of the chip is not advisable. In general, power budget $P_{budget}$ has a DC component due to current leakage and an AC component due to the functional operation of the circuitry aboard the chip. Each functional block 104A-M aboard IC chip 100 has a power requirement $P_{req}$ that likewise has a DC component due to leakage and an AC component due to it functional operation. This level of the intelligent power management of PMU 132 can be the consideration of the impact of powering up one or more presently powered-down functional blocks 104I-M on the overall power budget $P_{budget}$ of IC chip 100. For example, if powering up a particular functional block 104I-M would put the overall power requirement $P_{overall}$ of IC chip over the overall power budget $P_{budget}$, PMU 132 may delay the powering up of that block until the overall power requirement $P_{overall}$ of the chip reduces to a level that permits that block to be powered up. This may occur, e.g., when one or more other function blocks 104I-M are powered down after their use.

In order to implement this level of intelligence, lookup table 156 may include for each functional block 104I-M, i.e., for each identifier (I) its respective power requirement $P_{req}$, which may be expressed in terms of both a DC component (DC) and an AC component (AC). In this case, arguments for the intelligence are DC and AC and the corresponding function may be the truth statement that the sum of the power requirements of all operating and destination functional blocks 104A-M aboard IC chip 100, i.e., overall power requirement $P_{overall}$, is less than or equal to overall power budget $P_{budget}$ of the chip. Control logic 160 may perform the various steps necessary to perform the necessary look-up in lookup table 156, evaluate the function and, if the logic determines that a functional block 104I-M may be powered up, generate an appropriate fencing signal 144I-M that signal unit 152 may send to that functional block.

For yet another level of intelligence, each voltage island 124I-M may optionally include a temperature sensor 164I-M that provides a temperature signal 168I-M indicative of the temperature of that voltage island to PMU 132, e.g., to control logic 160. In this case, the argument is the temperature T of the voltage island 124I-M at issue and the corresponding function may be a truth statement that the temperature of that block is less than or equal to a maximum allowable temperature $T_{max}$ for that block. The values of $T_{max}$ for each functional block 104I-M may be stored in lookup table 156. If the actual temperature T of the voltage island 124I-M exceeds the maximum allowable temperature $T_{max}$ of that voltage island, PMU 132 may, e.g., delay the powering up of the corresponding functional block 104I-M until its temperature T is less than or equal to the maximum allowable temperature $T_{max}$. Alternatively, if another functional block 104I-M that can properly process the thread (136A-C) at issue is available and the temperature of that block is lower than its maximum allowable temperature of that block, PMU 132 may route the relevant thread to the alternate block. Similar to above, if control logic 160 determines that a functional block 104I-H may be powered up, it may send an appropriate signal to that functional block via signal unit 152. An example of lookup table 156 is shown immediately below.

TABLE

PMU LOOKUP TABLE

| Identifier (I) | State (S) (1-on. 0-off) | DC Power Draw (DC) (mW) | AC Power Draw (AC) (mW) | Temp. ($T_{max}$) (° C.) |
|---|---|---|---|---|
| PLB1 | 1 | .04 | .09 | 85 |
| OPB1 | 0 | .02 | .05 | 100 |
| OPB2 | 1 | .02 | .05 | 100 |
| OPB3 | 1 | .02 | .05 | 90 |
| OPB4 | 0 | .01 | .03 | 90 |

In some embodiments, it may be desirable to set the parameters of control logic 160 and set the values of lookup table 156 at the time IC chip 100 is manufactured. In other embodiments, it may be desirable to set control logic parameters and/or table values at some point after IC chip 100 is manufactured. In the latter case, PMU 132 may be provided with programming interface 172 that communicates with customer interface 104G so as to allow the PMU to be programmed via signals from offboard IC chip 100. As those skilled in the art will readily appreciate, there are many ways of implementing the various functionalities of PMU 132.

Figure 3A:
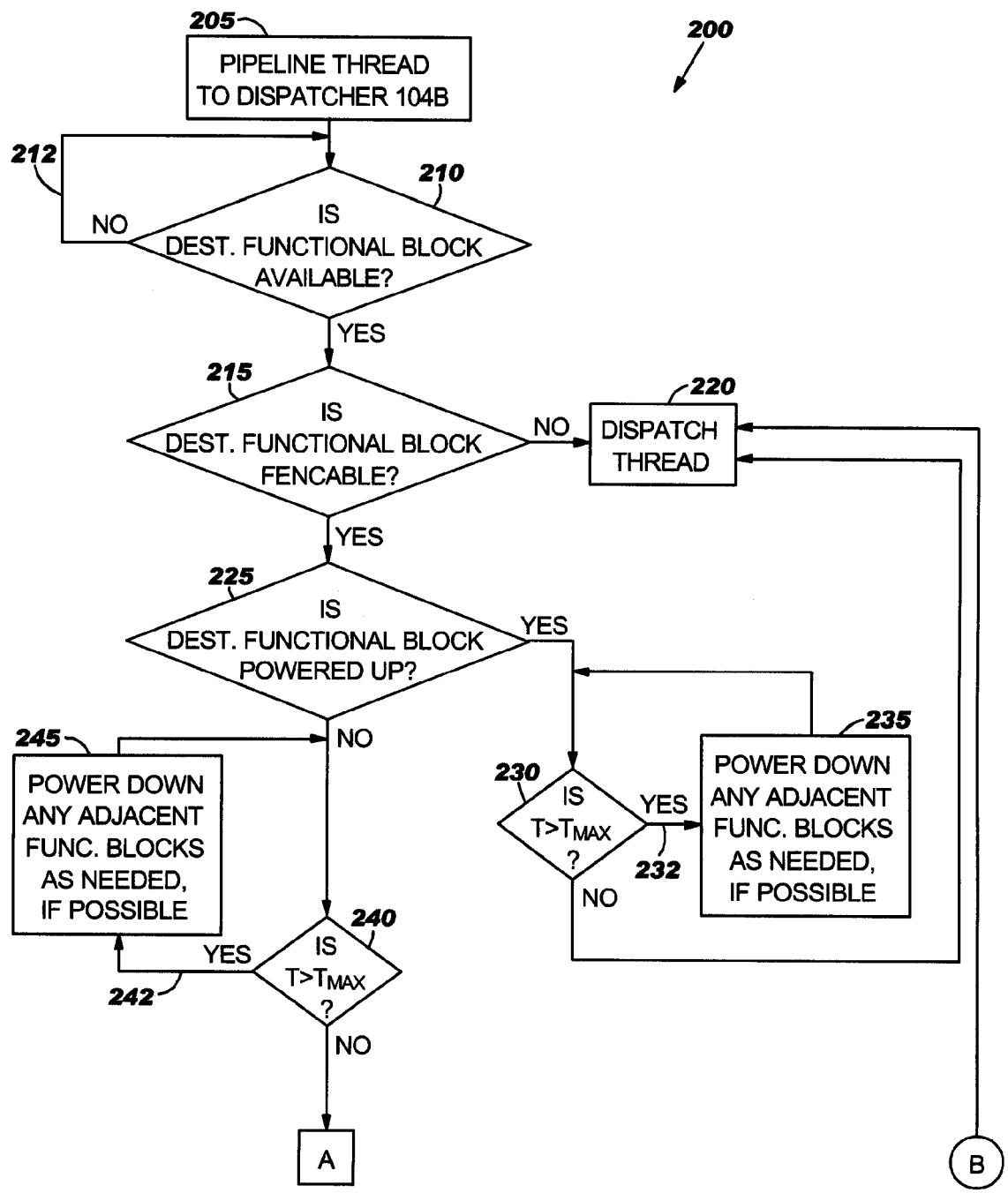
FIGS. 3A and 3B illustrate a power management method of the present invention that may be used in connection with the power modulation system of FIGS. 1 and 2.
Figure 3B:
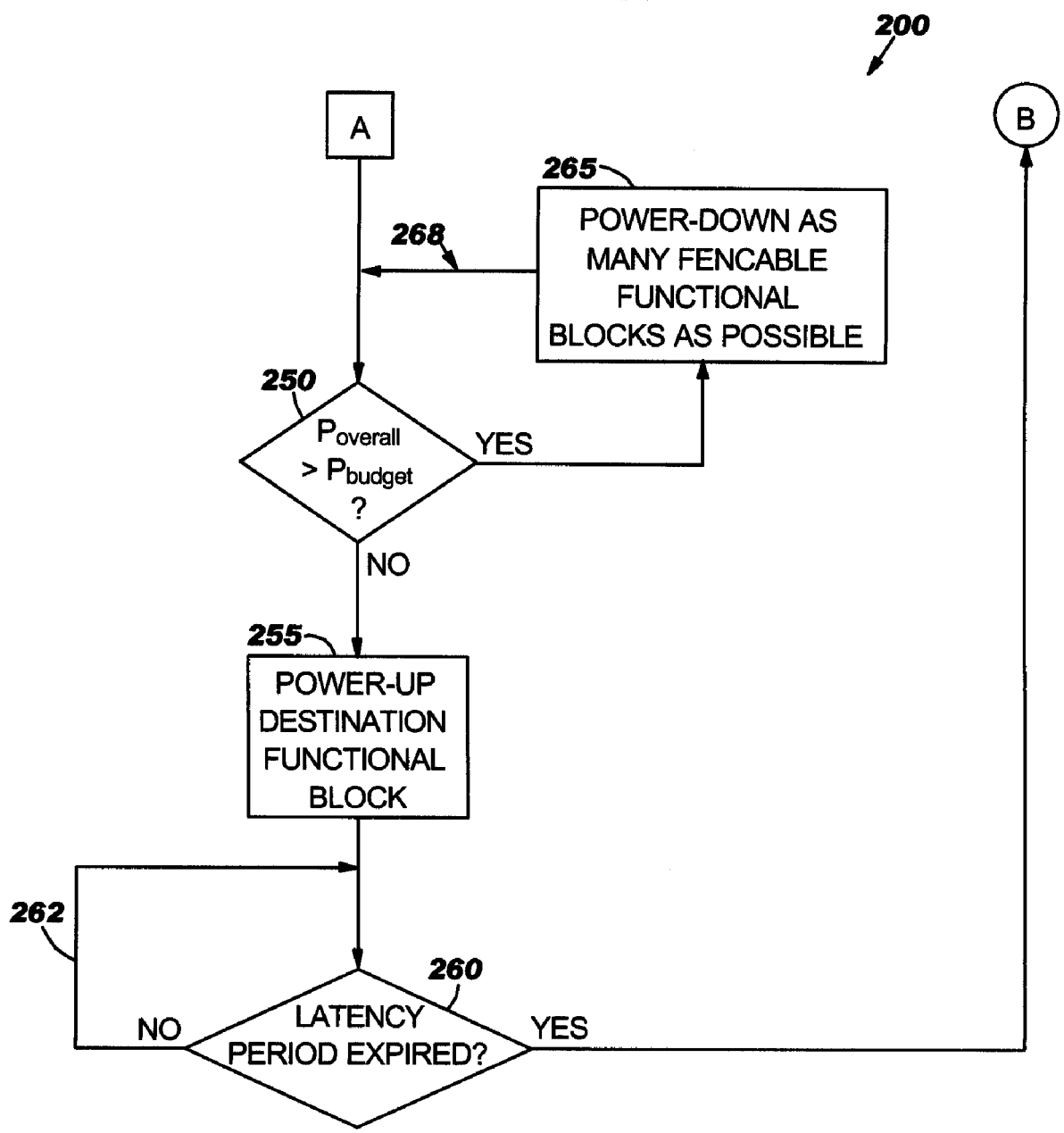

Referring now to FIGS. 3A and 3B, and also to FIGS. 1 and 2, FIG. 3 illustrates a power management method 200 that may be used in conjunction with IC chip 100 and power management system 128 of FIGS. 1 and 2. At step 205, threads 136A-C from microprocessor 104A are pipelined into dispatcher 104B. Step 205 may generally be performed in any suitable conventional manner. As mentioned above, each thread 136A-C generally comprises an identifier that identifies the destination functional block 104C-M, or, alternatively, a functional block type if more than one functional block can properly process a particular thread, and data to be used/processed by the corresponding functional block. At step 210, dispatcher 104B may determine whether or not a destination functional block 104C-104M, i.e., a functional block that is necessary to process the particular thread 136A-C, is available. If not, dispatcher 104B may enter a wait state 212 until a proper functional block 104C-M becomes available.

If, however, the destination function block 104C-M is availably, at step 215 it may determine whether or not the functional block 104C-M needed to process the particular thread 136A-C is of the type that can be selectively powered up and down, i.e., fencable. Step 215 may be performed, e.g., by dispatcher 104B and/or PMU 132 querying lookup table 156 as to whether or not the required functional block 104C-M is listed in the lookup table. In an alternative embodiment, lookup table 156 may include a list of all functional blocks 104A-M aboard IC chip 100, even those that cannot be selectively powered up and down, as is the case with only blocks 104I-M of the present example. In this case, lookup table 156 may include another field (not shown) that identifies the ones of functional blocks 104A-M that can be selectively powered up and down. Consequently, dispatcher 104B and/or PMU 132 could determine whether the appropriate value is in this field of the record of the functional block 104A-M at issue. If the destination functional block 104C-104M cannot be selectively powered up and down, dispatcher 104B may dispatch thread 136A-C at step 220 in a conventional manner.

In alternative embodiments (not shown), functional blocks 104A-H that cannot be selectively powered up and down may nonetheless be provided with temperature sensors and be assigned maximum safe operating temperatures $T_{max}$ in the manner described above. In this case, if the actual temperature of any destination functional block 104C-M exceeds $T_{max}$, dispatcher 104B may not dispatch thread 136A-C, but rather either enter a wait state or, if the thread has a high priority, power-down one or more adjacent blocks that can be selectively powered down and are either processing lower priority threads or not processing any threads. By powering down one or more adjacent functional blocks, the temperature of the destination block would typically decrease below the respective $T_{max}$ more quickly than if the adjacent block(s) were kept powered up.

If the destination functional block is determined at step 215 to be fencable, i.e., is one of blocks 104I-M in the present example, power management method 200 may proceed to step 225 at which it may be determined whether the destination block is already powered up. This may be done, e.g., by dispatcher 104B and/or PMU 132 querying the operating state field of lookup table 156 for the destination functional block 104I-M. If the destination functional block 104I-M is already powered up, dispatcher 104B and/or PMU 132 may determine at step 230 whether or not temperature T of the destination block is higher than its maximum allowable temperature $T_{max}$. If temperature T of the destination functional block 104I-M is higher than maximum allowable temperature $T_{max}$, power management method 200 may enter a wait state 232 and, optionally at step 235, power down any adjacent functional blocks possible, e.g., power down any fencable adjacent that are processing a lower priority thread or are powered up but sitting idle. Once temperature T of the destination functional block 104I-M becomes equal to or less than maximum allowable temperature $T_{max}$, dispatcher 104B may proceed with dispatching thread 136A-C at step 220.

If the required functional block is not already powered up at step 225, at step 240 it may be determined if the temperature T of the destination block is greater than maximum allowable temperature $T_{max}$. Step 240 may be performed by control logic 260 determining the actual temperature T from temperature signal 168I-M, querying lookup table 156 for the maximum allowable temperature $T_{max}$ and comparing the actual temperature T with the maximum allowable temperature $T_{max}$. If the actual temperature T of the destination functional block 104I-M is greater than the maximum allowable temperature $T_{max}$ of that block, power management method 200 may enter a wait state 242 and, optionally, at step 245 power down any adjacent functional blocks possible, e.g., that are processing a lower priority thread or are powered up but sitting idle.

Once the temperature T of the destination functional block becomes equal to or less than the maximum allowable temperature $T_{max}$, it may be determined at step 250 whether or not if turning the destination functional block 104I-M on, i.e., unfencing the block, will result in the overall power requirement $P_{overall}$ exceeding the power budget $P_{budget}$ of IC chip 100. PMU 132 may perform step 250 by calculating the sum of the power requirements $P_{req}$ of all powered-up functional blocks 104A-M and the destination block and comparing this sum to the overall power budget $P_{budget}$ of IC chip 100. If powering up the destination functional block 104I-M will not cause the overall power budget $P_{budget}$ to be exceeded, power management method 200 may proceed to step 255 in which the destination block is powered up, and then to step 260 in which it is determined whether the powering-up latency period has expired. If the latency period has not expired, power management method may enter a wait state 262 until the latency period has expired. Steps 255 and 260 may each be performed by PMU 132 in any suitable manner. Once the latency period has expired as determined at step 255, dispatcher 104B may dispatch thread 136A-C to the destination functional block 104I-M at step 220.

If at step 250 it is determined that powering up the destination functional block 104I-M will cause the overall power requirement $P_{overall}$ to exceed the power budget $P_{budget}$ of IC chip 100 to be exceeded, power management method 200 may proceed to step 265 at which one or more fencable functional blocks are powered down, e.g., by PMU 132, as necessary or as possible so as to increase the portion of the budget $P_{budget}$ that can be allocated to the destination block. Whether or not a fencable functional block 104I-M is a candidate for being powered down may be determined based on the priority of the thread it is processing or whether that block is being used at all. If no other fencable functional blocks 104I-M can be powered down, or if an insufficient number of fencable blocks can be powered down, power management method 200 may enter a loop 268. Once the overall power requirement becomes equal to or less than overall power budget while method is in loop 268, power management method 200 may then proceed to steps 255, 260 and 220 as described above. Those skilled in the art will readily appreciate that power management method 200 just described is merely exemplary and that a power management method of the present invention may be implemented in many other ways.

Although the invention has been described and illustrated with respect to an exemplary embodiment thereof, it should be understood by those skilled in the art that the foregoing and various other changes, omissions and additions may be made therein and thereto, without parting from the spirit and scope of the present invention.

What is claimed is:

1. An integrated circuit comprising:
   a) a plurality of voltage islands each including a functional block having an operating argument; and
   b) a power modulation unit in electrical communication with each of said plurality of voltage islands and operatively configured to fence any one of said plurality of voltage islands as a function of said operating argument of said functional block in said any one of said plurality of voltage islands being fenced, said power modulation unit including a lookup table containing said operating power requirement for each said functional block of said plurality of voltage islands;
   wherein each said operating argument is a power requirement that includes an AC component and a DC component, said lookup table containing said AC component and said DC component for each said functional block of said plurality of voltage islands.

2. An integrated circuit according to claim 1, wherein the integrated circuit has a power budget and said power modulation unit is operatively configured to fence any one of said plurality of voltage islands as a function of said power budget and said operating power requirement of the corresponding said functional block.

3. An integrated circuit according to claim 1, wherein each of said plurality of voltage islands includes a temperature sensor operatively configured to output a temperature signal, said power modulation unit being operatively configured to fence any one of said plurality of voltage islands as a function of said operating power requirement of the corresponding said functional block and said temperature signal.

4. An integrated circuit according to claim 1, wherein said power modulation unit is operatively configured to generate a fencing signal and each of said plurality of voltage islands includes an input having a state and state-saving circuitry operatively configured to save said state of said input during a powered down period, said state-saving circuitry being responsive to said fencing signal.

5. An integrated circuit according to claim 1, wherein said power modulation unit is operatively configured to generate a fencing signal and each of said voltage islands includes a power input and a switch that controls said power input and is responsive to said fencing signal.

6. An IC chip, comprising:
   integrated circuitry that includes:
   a) at least one power supply;
   b) a plurality of voltage islands each including a functional block electrically connected to said at least one power supply via a power switch, said functional block having an operating argument; and
   c) a power modulation unit in communication with each of said plurality of voltage islands and operatively configured to generate a fencing signal for each of said plurality of voltage islands as a function of said operating argument of the corresponding one of said functional blocks, said power modulation unit including a lookup table containing said operating power requirement for each said functional block of said plurality of voltage islands;
   wherein each said operating argument is a power requirement that includes an AC component and a DC component, said lookup table containing said AC component and said DC component for each said functional block of said plurality of voltage islands; and
   wherein the corresponding one of said power switches is responsive to said fencing signal.

7. An IC chip according to claim 6, wherein each of said functional blocks has an input state and each of said plurality of voltage islands further comprises state-saving circuitry operatively configured to save said input state when said switch is open.

8. An IC chip according to claim 7, wherein said state-saving circuitry is responsive to said fencing signal.

9. An IC chip according to claim 6, further comprising at least one SOC bus, said power modulation unit being in communication with each of said plurality of voltage islands via said at least one SOC bus.

10. An IC chip according to claim 6, further comprising a programming interface operatively connected to said power modulation unit.

11. An IC chip according to claim 6, wherein each of said plurality of voltage islands includes a temperature sensor operatively configured to output a temperature signal, said power modulation unit being operatively configured to fence any one of said plurality of voltage islands as a function of said operating power requirement of the corresponding said functional block and said temperature signal.

12. An IC chip according to claim 6, further comprising a microprocessor and wherein said functional blocks comprise respective peripherals.

13. A method of managing power usage of an integrated circuit, comprising:
   a) providing an integrated circuit having a power budget and comprising a plurality of functional blocks each having power requirement that includes an AC component and a DC component;
   b) looking up, in a lookup table containing said AC component and said DC component of each of the plurality of functional blocks, ones of said AC component and ones of said DC component; and
   c) selectively fencing ones of the plurality of functional blocks as a function of looking up of of said ones of said AC component and ones of said DC component.

* * * * *